Oct. 12, 1965    A. A. MANDATO    3,211,205
TRACTION DEVICE
Filed Dec. 23, 1963    2 Sheets-Sheet 1
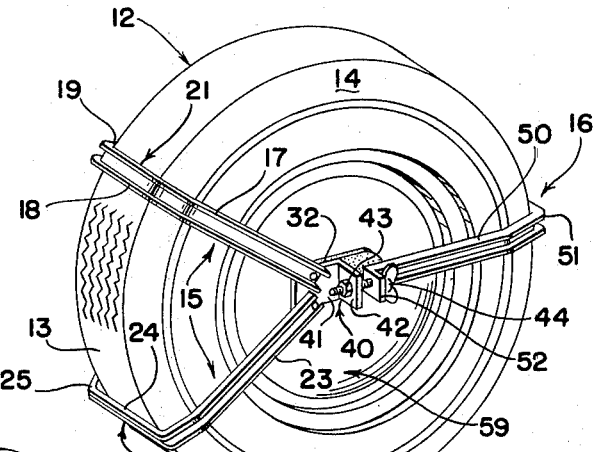
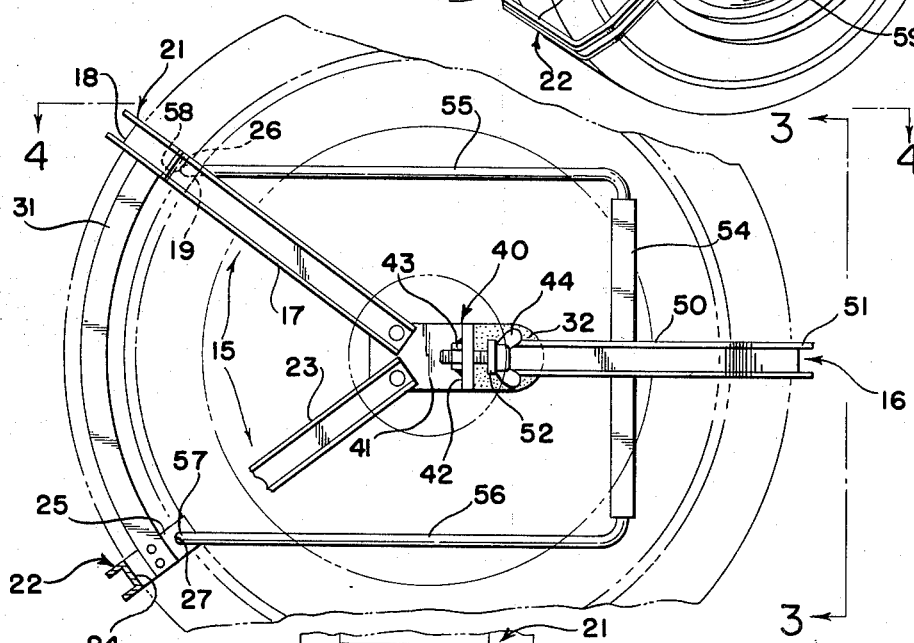
INVENTOR.
ANGELO A. MANDATO
BY
Fay & Fay
ATTORNEYS Oct. 12, 1965     A. A. MANDATO     3,211,205
TRACTION DEVICE
Filed Dec. 23, 1963     2 Sheets-Sheet 2
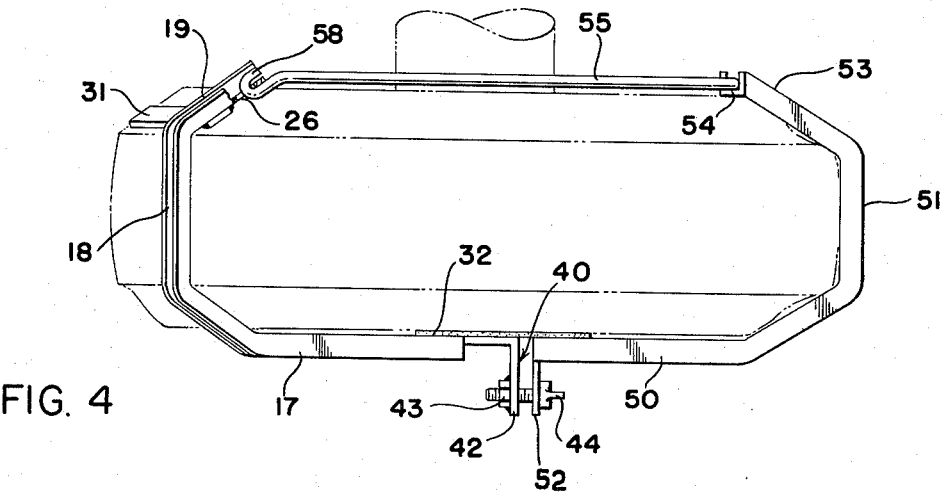
FIG. 4
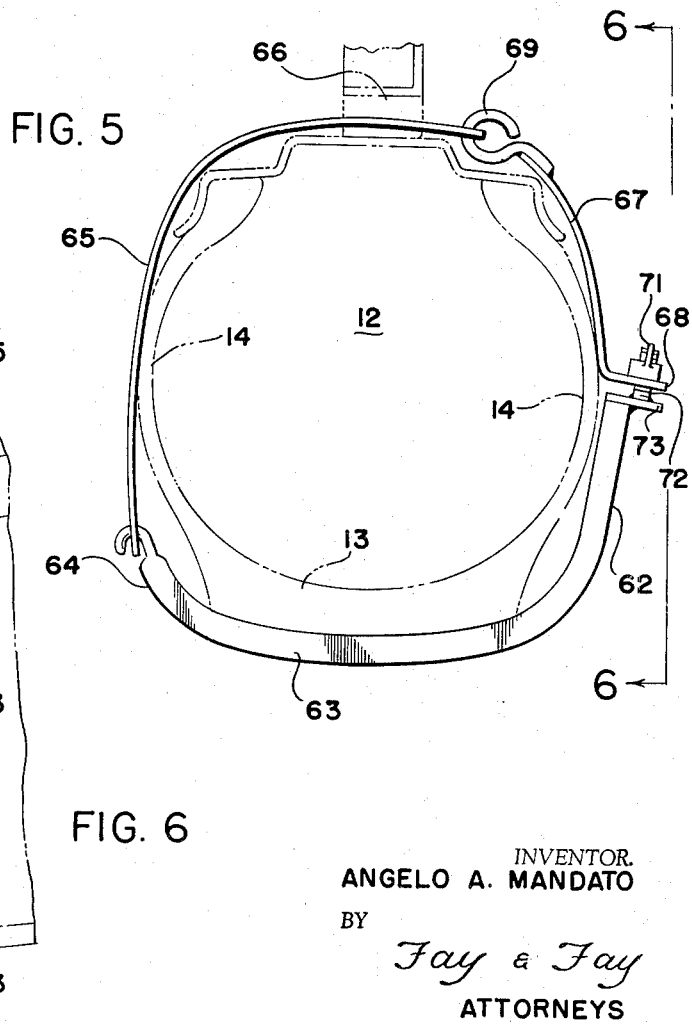
FIG. 5
FIG. 6
INVENTOR.
ANGELO A. MANDATO
BY
*Fay & Fay*
ATTORNEYS

3,211,205
TRACTION DEVICE
Angelo A. Mandato, 7557 Walton Road, Bedford, Ohio
Filed Dec. 23, 1963, Ser. No. 332,439
1 Claim. (Cl. 152—237)

This invention relates to accessories for automotive vehicles, and more particularly to a traction device for the vehicle wheels thereof.

Heretofore various traction devices for usage with vehicles under adverse and inclement weather conditions have been known. However, the prior art devices have proven to be ineffective because of the difficulty of installation, their susceptibility to breakage, and inadequate performance in general. For example, in using the well known chain type traction device, some way of gaining access to the entire periphery and circumference of the tire is necessary, and this often entails the elevation of the entire rear end. Also, under extreme icy conditons, the rounded biting edges provided by the chain links have proven to be inadequate in providing the desired traction. Lastly, due to the fragility of design, some of the prior art traction devices have proven to be incapable to withstand the rugged environmental conditions and have fractured thereunder. Due to the fragility of the prior art devices, considerable damage has been sustained to the fenders and other associated parts of the auto. It is to overcome these and other undesirable features of the prior art traction devices that this invention is directed.

It is an object of this invention to provide a traction device which is of basic construction and can be fabricated at a minimum cost.

It is a further object of this invention to provide a traction device that is easily mountable upon the wheels of a vehicle and which is extremely effective for any of a variety of road conditions.

It is still another object of this invention to provide a traction device that is easily mountable upon the wheels of a vehicle which is of rugged and lasting construction, and accordingly able to withstand rugged usage.

In accordance with the above and first briefly described, one embodiment of my invention comprises a two piece detachably securable traction device which is mountable upon a resilient vehicle tire. Accordingly, there is provided a first unit which includes two circumferentially displaced and radially extending U-shaped gripping members. One of the ends of each of the gripping members terminating in a centrally located linking means, and the other two ends terminating in hook receiving apertures. The second unit of the traction device comprises a radially extending U-shaped gripping member circumferentially displaced from said U-shaped gripping members of said first unit and having one end terminating in a locking means centrally of the vehicular wheel for co-operation with said linking means and having the other end terminating in bifurcating hooking members for co-operation with the circumferentially displaced hook receiving apertures of said gripping members of said first unit. Underlying the centrally located locking means a resilient hub cap protecting material may be provided.

Other objects and advantages of my invention will be set forth in the claim and will be apparent from the following description, when taken on connection with the accompanying drawings, in which:

FIG. 1 is a perspective view showing the traction device operatively positioned on a vehicular tire;

FIG. 2 is a front elevational view of my traction device showing the rearward working relationship thereof with some members broken way, and showing the vehicular tire in phantom;

FIG. 3 is a side elevational view showing the manner in which the gripping surfaces of my traction device encompasses an entire segmental portion of a vehicular tire including all of the tread area and wall portion thereof, and taken along the lines 3—3 of FIG. 2;

FIG. 4 illustrates the snug congruent mounting relationship of the traction device upon a typical vehicle tire and is plan view taken along the lines 4—4 of FIG. 2;

FIG. 5 illustrates a second embodiment of my traction device for use with vehicles having apertured wheel rims; and FIG. 6 illustrates the locking means utilized for my second embodiment as illustrated in FIG. 5 and is taken along the lines 6—6 thereof.

Referring now to the drawings, there is shown in FIG. 1 a coupleable two section, 15 and 16, traction device securely mounted upon the vehicle tire 12. Section 15 includes a plurality of radially outwardly extending U-shaped gripping members 21 and 22. However, although only two U-shaped gripping members are shown, it should be appreciated that any number may be employed. As shown in the mounted position of FIG. 1, front tire wall overlying arms 17 and 23 of the gripping U-shaped members of section 15 are fixedly connected to and extend radially from a frontal and centrally located angle member 40 to result in circumferentially spaced apart gripping surfaces 18 and 24. The U-shaped gripping members 21 and 22 have tread encompassing members 18 and 24 angularly displaced from each other along the tire periphery. Also laterally extending from the tread encompassing members are radially extending, centrally directed rear wall encompassing arms 19 and 25. The rear wall encompassing arms are terminated at a point substantially removed from the center of the wheel. Furthermore, hook receiving apertures 26 and 27 are provided in respective legs 19 and 25 for receiving the connecting means of the other section of the traction device in a manner to be more fully explained hereinafter. Arcuate linking member 31 is fixedly connected along the rearward side of gripping members 21 and 22, and more specifically is connected to legs 19 and 25 at a point intermediate from the terminating ends thereof. Arcuate link 31, accordingly, provides a stabilizing effect to the gripping members 21 and 22 and prevents any displacement or movement therebetween under actual traction providing conditions.

The central, frontly located angle member 40 is shown in FIGS. 1 and 2 as having one face or side thereof, side 41, fixedly connected to the terminating ends of front tire wall encompassing arms 17 and 23. The other face of angle member 40 is shown to be extending outwardly away from the tire in a substantially perpendicular relationship to side 41. Side 42 may be provided with a threaded aperture for securing purposes, or, in the alternative, a nut 43 may be fixedly attached to face 42 co-axially with an aperture therethrough.

The other section, 16, of the traction device is shown to be extending and mounted upon tire 12 in a position substantially opposed to that of section 15. As shown in FIGS. 1 and 2, section 16 comprises only a single gripping member however, it is possible here to also have any number of gripping members extending radially from a centrally located hub member. As shown, the U-shaped gripping member 16 is of flat inner surface construction similar to that of the gripping members of section 15 for congruous relationship with the tire tread and wall. Furthermore, member 16 is a substantially U-shaped design similar to that of section 15. Front wall overlying arm 50 is shown terminating with an outwardly extending flange or end member 52. Member 52 has a threaded aperture therethrough for receiving locking means 44. Locking means 44 may be a conventional wing headed bolt. U-shaped member 16 is shown having a gripping member 51 which overlies and is in engagement with the full tread width of the tire. The outer surface of member 51 is channel shaped for traction purposes.

Gripping member 16 is further provided with a rear tire wall encompassing arm 53 which projects laterally and radially inwardly toward the wheel center, and which extends substantially beyond the rear wall portion of tire 12 in a manner as shown in FIG. 4. Extending transverse to leg portion 53 is a transversely oriented bar member 54, which is fixedly connected to the terminating end of leg 53 on the inward or rearward side of the vehicle tire 12. Extending longitudinally from one end of transversely oriented bar member 54 is a rod 55. Extending from the other end of the transversely oriented bar 54 is a second rod 56. Rods 55 and 56 have formed on their end hook members 58 and 57, respectively. The hooks are shown are shown to be extending outwardly and away from the tire 12. Accordingly, hooks 57 and 58 will be inserted for securing relationship with the apertures 26 and 27 of gripping member 15 from an inwardly direction. This is best brought out in FIG. 4. It is, of course, obvious that the hooks are made to extend outwardly from the tire 12 in order to prevent any rupture or puncture thereof. As an alternative, a bifurcated hooking arrangement terminating in hook members 57 and 58 may have projected directly from the terminal point of rear arm 53.

In accordance with the invention, the traction device will be mounted on the tire in an easily, convenient, and accessible fashion. As can be seen in FIGS. 1 through 4, the traction device is operatively mounted to a vehicular tire 12 having tread portion or tread area 13 and walls 14 in a manner such that the gripping base members 18 and 24 of U-shaped section 15 and 51 of section 16 accommodate therewithin the tread area 13. The front wall of tire 12 is enclosed within front arm members 17 and 23 for section 15, and arm 50 of section 16. The rear wall of tire 12 is enclosed within rear arms 19 and 25 of section 15 and arm 53 of section 16.

As can be seen in FIG. 1, the traction device is positioned on tire 12 with angle member 40 centrally located with respect to the front of the tire and with legs 19 and 25 of the gripping members of section 15 straddling and encompassing the tire. Further, gripping members 18 and 22 are spaced about the circumference of the tire with the traction providing channel surface directed radially therefrom. Section 16 is then positioned about tire 12 such that hooks 57 and 58 are in a locking relationship with apertures 26 and 27 of rear wall arms 19 and 25. In this position, gripping member 51 will overlie tread portion 13 at a position circumferentially spaced from members 21 and 22. After section 16 has been secured, by hooking means 57 and 58, to section 15, wing screw 44 of flange member 52, of section 16, is brought into threaded engagement with nut 43 mounted on member 42 of the centrally located angle iron 40, to lock the two sections in place. Resilient pad 32 which underlies the frontal members of the traction device protects hub cap 59 from being damaged by the locking device.

When it is desired to remove the device from the tire 12, the reverse procedure is followed. Also, although it has not been expressly stated, it is, of course, possible to place a traction device such as that hereinbefore outlined on both rearward tires of the vehicle; however, it has been found that in numerous situations one such device is sufficient to extricate the vehicle.

As second embodiment of my invention is shown in FIGS. 5 and 6. This embodiment is preferably for usage with cars having spoked wheels or apertures through the rims of the wheels. As shown in FIG. 5, this invention comprises a detachably securable U-shaped gripping member adapted to overlay and have one surface thereof in engagement with the full tread width, the transverse dimension of the tread, of the tire. As shown in FIGS. 5 and 6, U-shaped gripping member 63 has an underside which is flat for flush engagement with the tread surface of the tire 12, however, the outer or gripping surface is channel formed, see FIG. 6. Extending laterally and upwardly from the gripping surface 63 are tire wall overlying arms 62 and 64. The lateral extending arm 64 terminates in a hook, as shown in FIG. 5. The other arm portion, 62, terminates in a threaded bolt-like member 72. It is shown, in FIG. 5, that laterally extending arm 62 terminates in an outwardly extending flange member 73, from which projects upwardly the threaded portion 72.

Also, provided is a flexible metal strap which may be of one-piece construction and is of the type that surrounds a segment of the tire. The strap may be a chain or may be of the type having at least one chain link, as shown in FIG. 5, to obtain the necessary strap flexibility and achieve the desired close fitting relationship therebetween. As shown in our FIG. 5, the preferred embodiment comprises a two-piece arrangement 65 and 67. Section 65 is provided with apertures at either end thereof, an aperture at one end thereof for receiving the hook terminating end of the tire wall overlying arm 64. The second section 67 is provided with an eyelet 69 engaging the other apertured terminal of section 65. The other end of section 67 terminates in an outwardly extending flange portion 68 which has an aperture extending therethrough. To sum up, the strap may be of any well known form to enable the gripping portion of the traction means to be held juxtaposed over the entire full tread width along a segment of the tire transversely thereto.

The purpose of breaking up the strap into two segments is to provide the necessary flexibility for shaping the strap congruently about the outer surface of the walls of the tire and the rim of the wheel. It can be appreciated that if the strap was of one-piece construction that as close a fit as is now attainable by our two-piece construction would not be possible. Also provided is a wing bolt 71 which, after the flanged section 68 of portion 67 has received the bolt 72, the two sections are secured together by screwing the wing bolt 71 in place. In that manner a proper working condition is obtained with no possibility of the two-piece traction device coming apart under operating conditions.

Accordingly, it is seen that I have provided a two-piece or two-section traction device comprising a U-shaped section having a base portion with a flat inner surface for engagement with the tread surface of a tire, and the outer surface thereof being channel shaped to provide the necessary gripping in adverse weather conditions. Laterally extending from the channel shaped gripping portion 63 are two wall portions 64 and 62.

As seen in FIG. 5, the wall portions extend from opposite ends of the bottom gripping surface and overlie opposite wall portions of the tire 12 while the gripping member overlays the tread of the tire. The securing strap is of two-piece construction, the one piece 65 having apertures on either end thereof, one aperture engaging the hook 64 of one side wall member and the other aperture engaging the eyelet 69 of a second section 67. The opposite end of 67 terminates in an outwardly extending flange 68 having an aperture therethrough. The aperture of flange 68 mates with the bolt terminating portion 72 of side wall 62. After the strap has been put in place and the bolt threaded through the aperture of flange 68, the traction device is fixedly and securely held in place to the tire by screwing on wing nut 71.

When installing the traction device of FIGS. 5 and 6 on the vehicle tire, it is advisable to place the U-shaped section about the side of the tire and then to secure the aperture of strap 65 to the hook 64. The opposite end of the strap, more exactly section 67, is then threaded through the aperture in the wheel rim to encircle one segment of the tire 12. The bolt 72 is then passed through the aperture of flange 68 and the wing screw 71 is threadedly engaged thereto to hold the two-piece section firmly in place about a segment of the wheel 12.

While it will be apparent that the embodiments of this invention herein disclosed are well calculated to fulfill the objects of the invention, it will be appreciated that the invention is susceptible to modification, variation and change, without departing from the proper scope or fair meaning of the subjoined claim.

I claim:

An adjustable traction device securable about a tire juxtaposed the tread and overlying the full tread width along a circumferential segment of the tire comprising a U-shaped gripping member including a base member for overlying engagement with the full tread width of the tire, and having wall encompassing arms extending from opposite ends thereof overlying opposite wall portions of a tire while the base member overlies the tread, the inner surface of said gripping member being flat for congruent conformity with said tire, a hook formed at a terminal end of one of said wall portions and the other wall portion terminating in a threaded bolt like member, a two-piece strap member, a first piece thereof being non-flexible and having an arcuate shape for congruent association with a wall of the tire and the wheel rim, said arcuate first piece having an aperture at one end thereof for engagement with the hooked end of said wall portion, the second piece of said two-piece strap member flexibly joined to the other end of said first piece and being of arcuate shape for congruent association with the other wall of said tire and terminating in a flanged end portion extending outwardly from said wall, said flanged portion having an aperture therethrough for receipt of said bolt terminating member of the other wall portion of said gripping member after said two-piece strap member is encircled about said tire through an aperture in the wheel rim, and means for holding said flanged portion in fixed relation to said bolt terminal member, said traction device being mountable to a tire from a position outwardly of said tire by holding said U-shaped gripping member upon said tread portion of said tire, passing said non-flexible first piece of said two-piece strap member through an aperture in the wheel rim and hooking said aperture of said non-flexible first piece to said hook terminal end of said wall portion and finally locking said flanged terminal end of said second piece of said two-piece strap member to said bolt terminal member.

References Cited by the Examiner

UNITED STATES PATENTS

| | | | |
|---|---|---|---|
| 1,292,698 | 1/19 | Buchanan et al. | 152—228 |
| 1,470,819 | 10/23 | Eder | 152—228 |
| 2,450,776 | 10/48 | Achenbach | 152—228 |
| 2,616,476 | 11/52 | Gerds | 152—228 |
| 2,744,558 | 5/56 | Ciavola | 152—228 |
| 2,746,509 | 5/56 | Lang | 152—237 |

FOREIGN PATENTS

| | | |
|---|---|---|
| 546,364 | 7/42 | Great Britain. |

ARTHUR L. LA POINT, *Primary Examiner.*